United States Patent
Boutaghou

[11] Patent Number: 5,938,348
[45] Date of Patent: Aug. 17, 1999

[54] PIVOT BEARING

[75] Inventor: Zine-Eddine Boutaghou, Owatonna, Minn.

[73] Assignee: International Business Machines Corporation, Armonk, N.Y.

[21] Appl. No.: 09/039,712

[22] Filed: Mar. 16, 1998

Related U.S. Application Data

[62] Division of application No. 08/707,813, Aug. 30, 1996, Pat. No. 5,755,518, which is a division of application No. 08/446,381, May 22, 1995, Pat. No. 5,835,309.

[51] Int. Cl.⁶ .................................................. F16C 19/50
[52] U.S. Cl. .......................... 384/610; 384/609; 384/611
[58] Field of Search ..................................... 384/610, 611, 384/609, 612, 613

[56] References Cited

U.S. PATENT DOCUMENTS

| | | | |
|---|---|---|---|
| 1,920,546 | 8/1933 | Brunner | 384/607 |
| 2,063,787 | 12/1936 | Brown | 384/610 |
| 2,216,726 | 10/1940 | Andersen . | |
| 2,544,166 | 3/1951 | Limberger | 384/610 |
| 3,655,226 | 4/1972 | Cowan | 287/119 |
| 4,265,498 | 5/1981 | Luce et al. . | |
| 4,597,678 | 7/1986 | Angelbeck et al. | 384/452 |
| 4,792,245 | 12/1988 | Fuke et al. | 384/610 |
| 4,856,918 | 8/1989 | Inoue et al. | 384/610 |
| 4,865,529 | 9/1989 | Sutton et al. | 384/610 |
| 4,993,851 | 2/1991 | Nakanishi | 384/512 |
| 5,030,019 | 7/1991 | Stahlecker | 384/610 |
| 5,051,855 | 9/1991 | Ghose et al. | 360/106 |
| 5,200,866 | 4/1993 | Fruge et al. | 360/99.08 |
| 5,213,000 | 5/1993 | Saya et al. | 74/425 |
| 5,284,391 | 2/1994 | Diel et al. | 384/108 |
| 5,291,355 | 3/1994 | Hatch et al. | 360/97.01 |
| 5,430,590 | 7/1995 | Ainslie et al. | 360/99.08 |
| 5,510,940 | 4/1996 | Tacklind et al. | 384/610 |

FOREIGN PATENT DOCUMENTS

| | | |
|---|---|---|
| 0193699 | 9/1986 | European Pat. Off. . |
| 0289135 | 11/1988 | European Pat. Off. . |
| 0599563 | 6/1994 | European Pat. Off. . |
| 62-255611 | 11/1987 | Japan ................ F16C 17/08 |
| 2099205 | 12/1982 | United Kingdom . |

*Primary Examiner*—Lenard A. Footland
*Attorney, Agent, or Firm*—Roy W. Truelson

[57] ABSTRACT

A bearing design for a rotatable assembly includes two freely rotating balls mounted on the axis of rotation of the assembly and axially separated, one near each axial end of the assembly. Each ball is confined by a moving concave bearing surface of the rotatable assembly and a corresponding fixed concave bearing surface of a mounting attached to a frame, housing, or similar non-rotating structure. One of the fixed mountings is preferably attached to a compressible spring to provide a controlled axial pre-load to the assembly. The balls are substantially enclosed and lubricant provided in the enclosed cavity. In the preferred embodiment, the rotatable assembly is a rotary actuator assembly of a disk drive. Compared to conventional ball bearing designs, the present design reduces the number of parts and volume of space occupied by the bearings, reduces hysteresis, and improves shock resistance.

9 Claims, 8 Drawing Sheets

PIVOT BEARING

RELATED APPLICATIONS

The present application is a divisional application of commonly assigned co-pending application Ser. No. 08/707,813, by Zine-Eddine Boutaghou, filed Aug. 30, 1996, U.S. Pat. No. 5,755,518 which is a divisional application of commonly assigned co-pending application Ser. No. 08/446,381, by Zine-Eddine Boutaghou, filed May 22, 1995, U.S. Pat. No. 5,835,309, both of which are herein incorporated by reference.

FIELD OF THE INVENTION

The present invention relates to bearings used to support rotatable assemblies and, in particular, to bearings used in disk drive actuators and spindles.

BACKGROUND OF THE INVENTION

The extensive data storage needs of modem computer systems require large capacity mass data storage devices. A common storage device is the rotating magnetic disk drive.

A disk drive typically contains one or more smooth, flat disks which are rigidly attached to a common spindle. The disks are stacked on the spindle parallel to each other and spaced apart so that they do not touch. The disks and spindle are rotated in unison at a constant speed by a spindle motor.

Each disk is formed of a solid disk-shaped base or substrate, having a hole in the middle for the spindle. The substrate is commonly aluminum, although glass, ceramic, plastic or other materials are possible. The substrate is coated with a thin layer of magnetizable material, and may additionally be coated with a protective layer.

Data is recorded on the surfaces of the disks in the magnetizable layer. To do this, minute magnetized patterns representing the data are formed in the magnetizable layer. The data patterns are usually arranged in circular concentric tracks. Each track is further divided into a number of sectors. Each sector thus forms an arc, all the sectors of a track completing a circle.

A movable actuator positions a transducer head adjacent the data on the surface to read or write data. Although earlier disk drive designs used a linear actuator, which moved back and forth on straight rails, most disk drives now being produced use a rotary actuator, which pivots about an axis. The rotary actuator may be likened to the tone arm of a phonograph player, and the head to the playing needle.

There is one transducer head for each disk surface containing data. The transducer head is an aerodynamically shaped block of material (usually ceramic) on which is mounted a magnetic read/write transducer. The block, or slider, flies above the surface of the disk at an extremely small distance as the disk rotates. The close proximity to the disk surface is critical in enabling the transducer to read from or write to the data patterns in the magnetizable layer. Several different transducer designs are used, and in some cases the read transducer is separate from the write transducer.

A rotary actuator typically includes a solid block near the axis having comb-like arms extending toward the disk, a set of thin suspensions attached to the arms, and an electromagnetic motor on the opposite side of the axis. The transducer heads are attached to the suspensions, one head for each suspension. The actuator motor rotates the actuator to position the head over a desired data track. Once the head is positioned over the track, the constant rotation of the disk will eventually bring the desired sector adjacent the head, and the data can then be read or written.

As computer systems have become more powerful, faster, and more reliable, there has been a corresponding increase in demand for improved storage devices. These desired improvements take several forms. It is desirable to reduce cost, to increase data capacity, to increase the speed at which the drives operate, to reduce the electrical power consumed by the drives, and to increase the resilience of the drives in the presence of mechanical shock and other disturbances.

In particular, there is a demand to reduce the physical size of disk drives. To some degree, reduction in size may serve to further some of the above goals. But at the same time, reduced size of disk drives is desirable in and of itself. Reduced size makes it practical to include magnetic disk drives in a range of portable applications, such as laptop computers, mobile pagers, and "smart cards".

An example of size reduction is the application of the PCMCIA Type II standard to disk drives. This standard was originally intended for semiconductor plug-in devices. With improvements to miniaturization technology, it will be possible to construct disk drives conforming to the PCMCIA Type II standard.

In order to shrink the size of disk drives, every component must be reduced in size as much as possible. Additionally, because the PCMCIA Type II standard, as well as many other small form factor drives, are intended for portable use, it is necessary that such devices be capable of tolerating a high mechanical shock, such as might occur when a disk drive is dropped onto a hard floor. Conventional drives designed for desktop applications have been susceptible to shock damage. With portable applications becoming more significant, there is a need to find new design techniques to permit reduced size and power consumption, to make assembly of miniaturized components practical, and prevent the drive from being damaged when exposed to mechanical shock.

Conventionally, the rotatable disk spindle assembly and the rotary actuator assembly are supported by sets of ball bearings housed in annular races. Typically, there are two sets of bearings for the disk spindle and two for the rotary actuator, the two sets supporting a particular assembly being axially separated to provide greater stability. The number of parts makes it increasingly difficult to shrink the size of the bearing assembly. Additionally, when this design is miniaturized for a small form factor disk, individual balls become extremely small and susceptible to mechanical shock. Finally, multiple balls generate significant bearing drag and mechanical hysteresis, the latter being particularly troublesome for rotary actuators, which frequently alter direction.

It has been proposed to address problems of miniaturization of spindle bearings by using fluid or hydrodynamic bearings. Such bearing designs could potentially reduce parts, permit greater speeds, and enhance shock resistance of spindle bearings. However, oil containment in such a limited space is a major problem which has yet to be completely overcome. Additionally, proper operation of a fluid bearing requires continuous, high speed rotation. Disk spindles, which typically rotate at high constant speed, may become suitable applications. But a rotary disk actuator typically moves back and forth in a short arc. The motion of a disk actuator would generally not produce sufficient fluid pressure to support a fluid bearing, and fluid bearings would therefore be unsuitable for disk actuator assemblies.

SUMMARY OF THE INVENTION

It is, therefore, an object of the present invention to provide an enhanced bearing for supporting pivotable assemblies.

Another object of the present invention to provide an enhanced disk drive storage apparatus.

Another object of this invention is to reduce the cost of a disk drive storage apparatus.

Another object of this invention is to reduce the number of parts in a bearing assembly, particularly a bearing assembly of a disk drive storage apparatus.

Another object of this invention is to provide a disk drive storage apparatus which is easier to fabricate and assemble.

Another object of this invention is to reduce the volume of a bearing and pivotable assembly.

Another object of this invention is to provide a bearing assembly having greater resistance to mechanical shock.

Another object of this invention is to reduce the size of a disk drive storage apparatus.

Another object of this invention is to provide a disk drive storage device having greater resistance to mechanical shock.

Another object of this invention is to reduce the amount of power required to operate a rotatable assembly, an in particular a rotatable assembly of a disk drive storage device.

A bearing design for a rotatable assembly includes two freely rotating balls mounted on the axis of rotation of the assembly and axially separated, one near each axial end of the assembly. Each ball is confined by a moving concave bearing surface of the rotatable assembly and a corresponding fixed concave bearing surface of a mounting attached to a frame, housing, or similar non-rotating structure.

In the preferred embodiment, the rotatable assembly is a rotary actuator assembly of a disk drive. The bearing surfaces are preferably concave surfaces defining an inner space in the shape of a cone or frustum of a cone, which is centered about the axis of rotation. The ball, which is preferably spherical, occupies part of the spaces defined by the concave bearing surfaces. One of the fixed mountings is attached to a compressible spring to provide a controlled axial pre-load to the assembly. The actuator assembly and actuator mounting on the housing mate to substantially enclose the ball. A lubricant is provided in the enclosed space. The space is sealed with an O-ring.

Compared to conventional ball bearing designs for actuators and spindles, the present invention provides numerous advantages. It reduces the number of parts and the volume of space occupied by the bearings. The reduction in number of balls will reduce hysteresis and bearing drag, reducing power requirements of the actuator motor. At the same time, the ball itself, and the contact area between the ball and bearing surfaces, is much larger, making the bearing more shock resistant.

Various alternative embodiments of the present invention are possible. For example, the bearing may be used to support the spindle motor of a disk drive. It may be used in any of numerous applications where reduced size of the assembly is an important consideration, including micromotors (size in microns).

DETAILED DESCRIPTION OF THE PREFERRED EMBODIMENT

Figure 1:
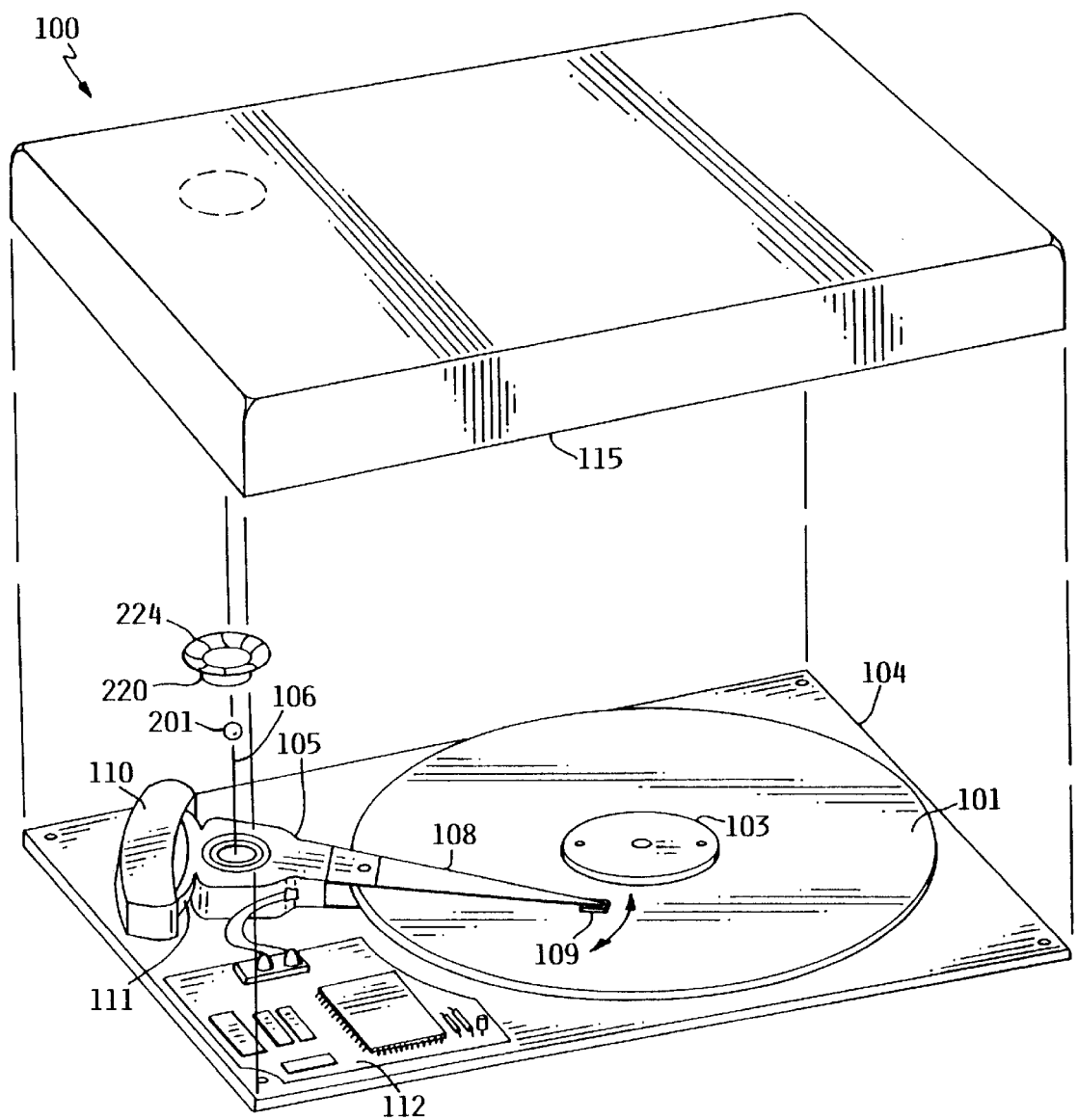
FIG. 1 shows a magnetic disk drive storage unit according to the preferred embodiment.

FIG. 1 is a partially exploded view of a magnetic disk drive storage unit 100 in accordance with the preferred embodiment. Disk unit 100 comprises rotatable disk 101, which is rigidly attached to hub 103. Hub 103 is rotatably mounted on disk drive base 104. Hub 103 and disk 101 are driven by a drive motor at a constant rotational velocity. The drive motor is contained within hub 103. Actuator assembly 105 is situated to one side of disk 101. Actuator 105 pivots through an arc about axis 106 parallel to the axis of the spindle to position the transducer heads. Actuator 105 is driven by an electro-magnetic motor comprising a set of permanent stationary magnets 110 rigidly attached to base 104, and an electro-magnetic coil 111 attached to the actuator. Cover 115 mates with base 104 to form a complete enclosure or housing, to protect the disk and actuator assemblies. Electronic modules for controlling the operation of the drive and communicating with another device, such as a host computer, are mounted on a circuit card 112 within the head/disk enclosure formed by base 104 and cover 115. In this embodiment, circuit card 112 is mounted within the enclosure and shaped to take up unused space around the disk in order to conserve space, as would be used for a PCMCIA Type II form factor. However, the card 112 could also be mounted outside the head/disk enclosure, or the base itself could be made as a circuit card for mounting electronic modules directly to it. A plurality of head/suspension assemblies 108 are rigidly attached to the prongs of actuator 105. An aerodynamic read/write transducer head 109 is located at the end of each head/suspension assembly 108 adjacent the disk surface.

Actuator 105 pivots on a pair of spherical balls, one of which is shown in FIG. 1 as feature 201. The balls are confined by respective mounting (one shown in FIG. 1 as feature 220) and concave surfaces of the actuator. Mounting 220 is attached to a compressible spring 224, which is positioned within a relief in the inner surface of cover 115.

While only a single disk is shown in the preferred embodiment (as would be typical of a PCMCIA type II form factor disk drive), is should be understood that the number of disks mounted on hub 103 may vary.

Figure 2:
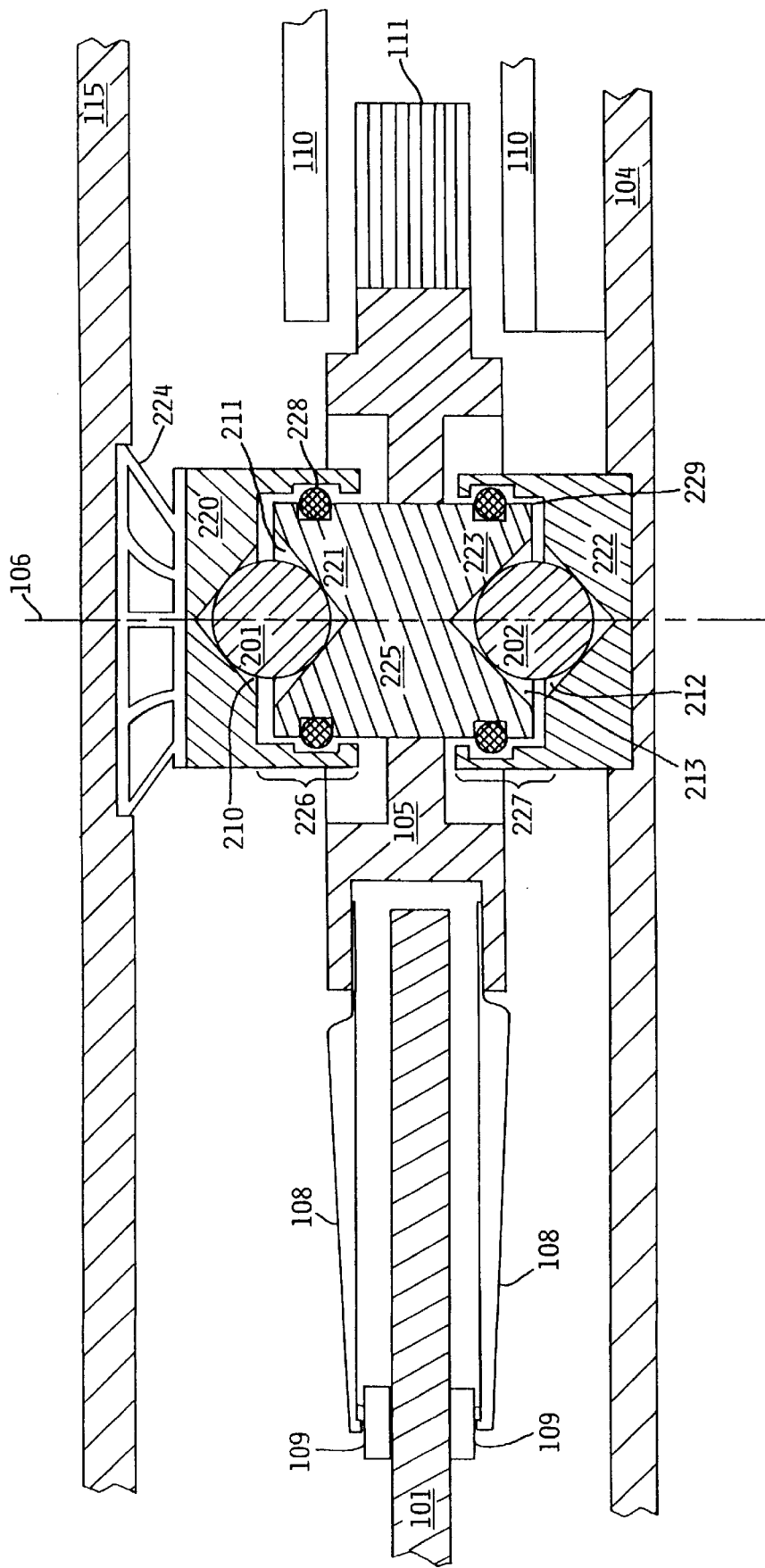
FIG. 2 is a partial cross-sectional view of the magnetic disk drive, showing the actuator assembly, according to the preferred embodiment.

FIG. 2 is a partial cross-sectional view of disk drive 100, taken in the plane of actuator axis 106, showing more clearly certain components of the actuator bearing assembly. For ease of orientation, actuator 105 is shown with attached suspensions 108 and transducer heads 109 which access data on disk 101, on one side of axis 106. On the other side of axis 106 is the actuator motor, comprising stationary magnets 110 attached to base 104 and coil 111 attached to actuator 105.

The actuator bearing assembly comprises two freely rotating spherical balls 201,202, both of which are centered on actuator axis 106 and axially separated. Each ball 201,202 is confined by a respective pair of concave bearing surfaces. Bearing surfaces 210,211 confine ball 201, and bearing surfaces 212,213 confine ball 202. Preferably, each bearing surface 210–213 is conical or frustro-conical in shape, the cones being centered on axis 106.

Bearing surfaces 210, 212 are preferably machined inner surfaces of respective cylindrical mounting blocks 220, 222. Mountings 220,222 are stationary with respect to the disk base 104, i.e., they do not pivot with the actuator. In the preferred embodiment, lower mounting block 222 is rigidly attached to base 104 by press fit in a corresponding relief cavity, or by attachment with adhesive, screws, or other appropriate means. Alternatively, block 222 could be an integral part of a base casting, in which surface 212 is machined or otherwise formed. Upper mounting 220 is preferably attached to compressible pre-load spring 224 with a suitable adhesive. Spring 224 is in turn attached to cover 115 with adhesive or by press fit into a relief cavity in the cover.

Mountings 220,222 preferably include respective hollow cylindrical shroud portions 226,227 which extend over and encircle the mating portions of actuator 105. A pair of O-rings 228,229 are positioned surrounding the axis 106, within circumferential grooves of the actuator and shroud portions. O-rings 228,229 seal the cavities in which balls 201,202 are located. To reduce friction, O-rings 228,229 would preferably not be in contact with shroud portions 226,227, but their close proximity to the shrouds forms a labyrinth seal of the cavities. A lubricant (not shown) is placed in the cavities before sealing.

Bearing surfaces 211, 213 are preferably machined inner surfaces of shaft member 225. Shaft member 225 comprises upper mounting portion 221 having bearing surface 211 for contacting ball 201, and lower mounting portion 223 having bearing surface 213 for contacting ball 202. In the preferred embodiment, shaft member 225 is a separate member which is rigidly attached to actuator 105, allowing shaft 225 to be formed of different materials than used in actuator 105. Actuator 105 is preferably aluminum, while shaft 225 is preferably steel. However, shaft 225 and actuator 105 could be integrally formed, or mounting portions 221,223 could be separate members which are individually attached to actuator 105 or shaft 225.

In a disk drive, it is highly desirable to obtain precise orientation of the actuator in order to accommodate the high track densities of typical drives. For this purpose, the bearings should be pre-loaded to restrict wobble of the actuator. In the preferred embodiment, pre-loading of the bearings is accomplished by imparting an axial force to mounting 220 with compressible pre-load spring 224. Because actuator 105 floats freely between balls 201,202, the axial force is transmitted through ball 201, actuator 105, and ball 202, into mounting 222. The pre-load forces ball 201 against conical bearing surfaces 210,211 and forces ball 202 against conical bearing surfaces 212,213, firmly centering actuator 105 on axis 106.

Figure 3:
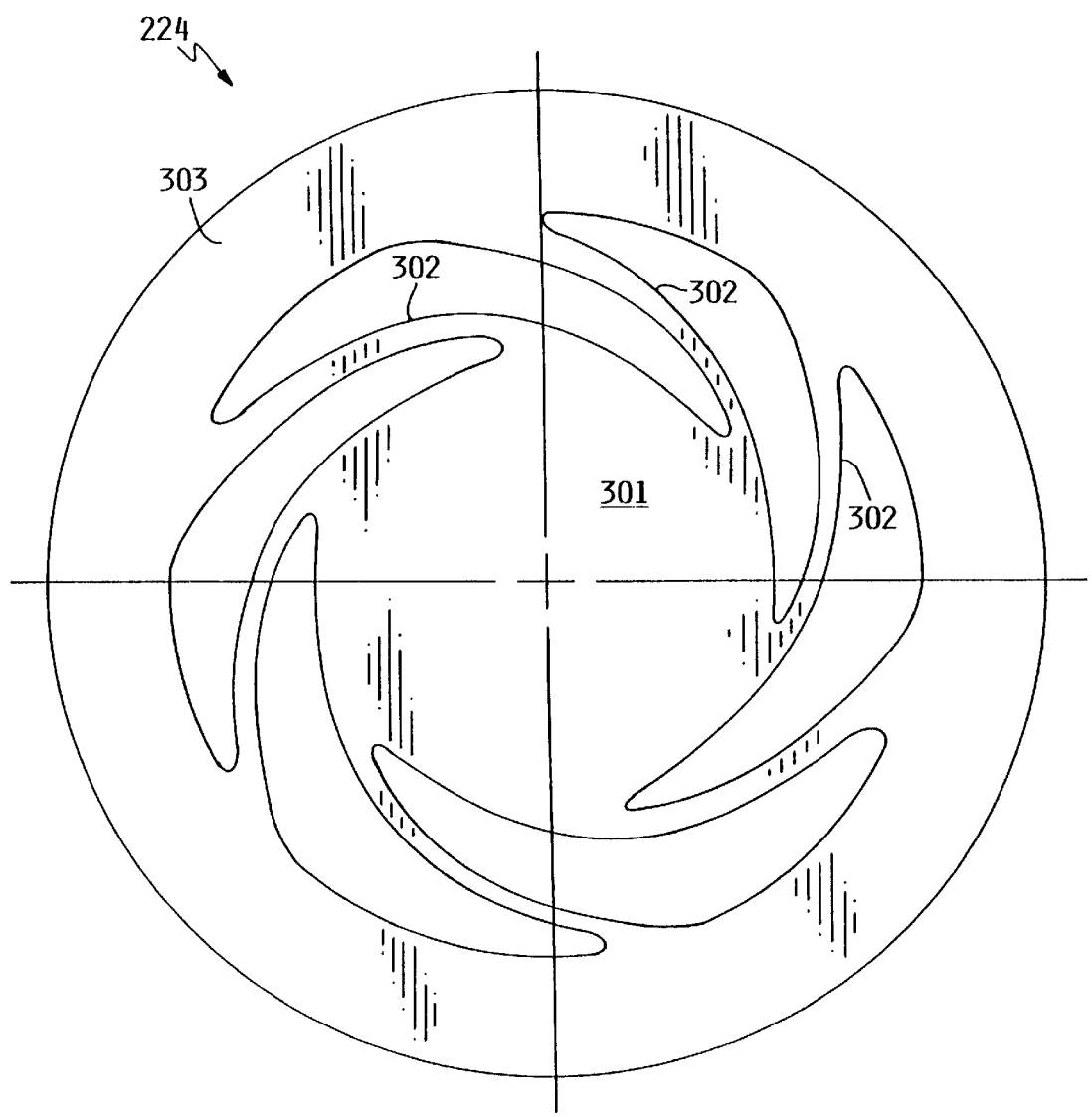
FIG. 3 is a top view of the pre-load spring of the preferred embodiment.

FIG. 3 is a top view of pre-load spring 224. Spring 224 is preferably a radially symmetrical member formed by stamping from stainless steel sheet having an appropriate thickness. Spring 224 includes a solid central portion 301 for attachment to mounting block 220 and a plurality of curved arms 302, radially extending from the central portion to an outer perimeter 303. Outer perimeter 303 is attached to cover 115. The arms are permanently deformed in the stamping process so that central portion 301 and outer perimeter 303 lie in parallel planes offset from each other. This design provides a compressible spring having a very small vertical dimension.

Figure 4:
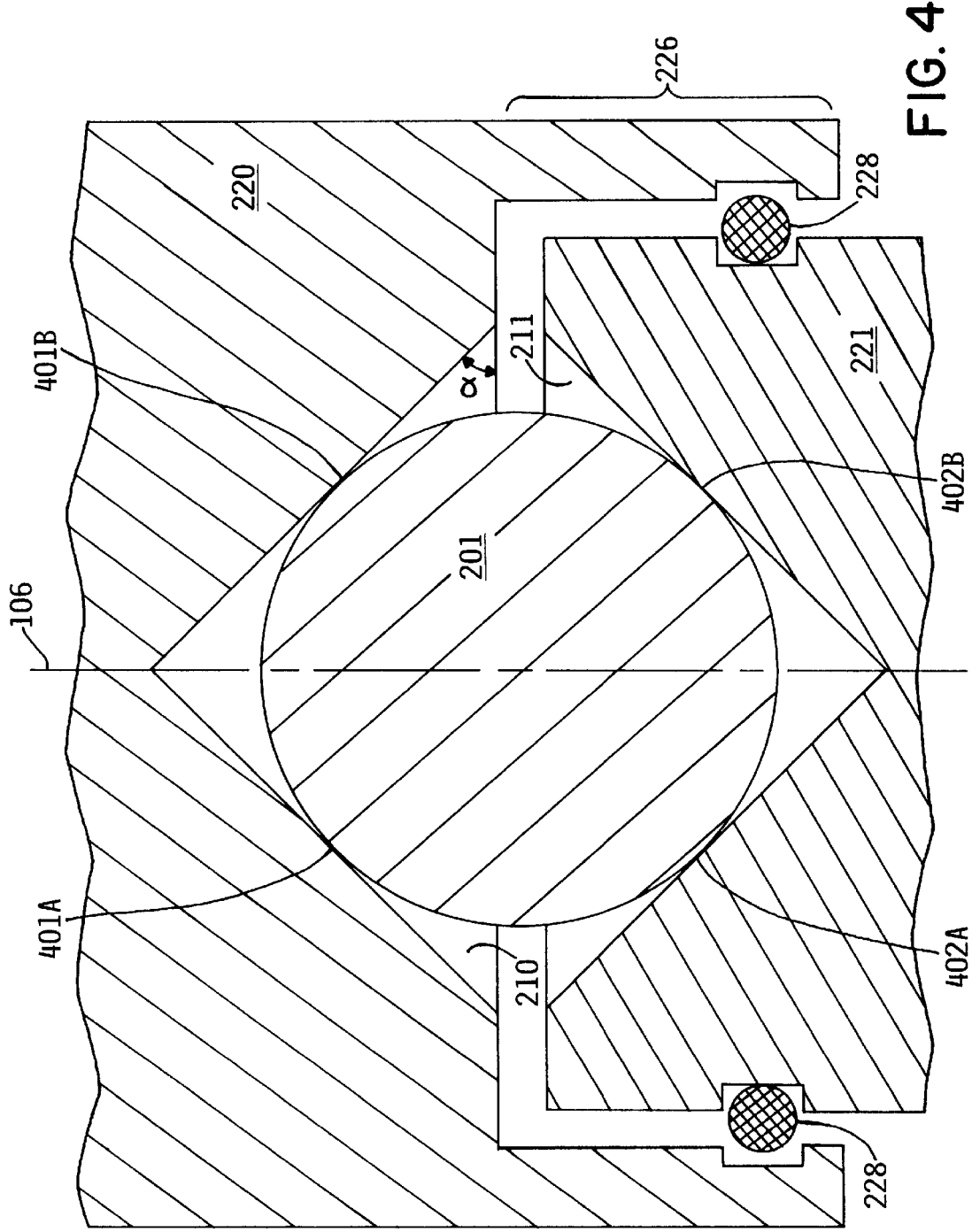
FIG. 4 is an enlarged cross-sectional view of a single ball and corresponding conical bearing surfaces according to the preferred embodiment.

Balls 201,202 contact bearing surfaces 210–213 along annular portions of the surface and balls. Conical surfaces 210–213 form an angle with respect to a plane perpendicular to actuator axis 106. This angle is shown in FIG. 4 for bearing surface 210, and designated alpha ($\alpha$). The selection of an appropriate angle $\alpha$ will involve various engineering decisions. As the angle becomes shallower, the ball annular area of contact is reduced in radius; as the angle becomes steeper, the annular area of contact is increased in radius. The consequence of this is that a steeper bearing surface angle increases stability, but also increases friction. An angle of approximately 45 degrees is preferred as a reasonable trade-off between high stability and low friction. In the preferred embodiment, all bearing surfaces form the same angle. However, it would be possible to construct the bearing assembly of the present invention with differing angles, or where the bearing surfaces are arched or spherical, with differing radii. The rotational velocity of the balls will generally be somewhere between zero and the rotational velocity of the actuator or other rotating member. This rotational velocity may also be adjusted by varying the relative contact angles of the bearing surfaces.

When compared with a conventional actuator design in which a plurality of balls are placed in an annular race surrounding a shaft, the present design significantly improves shock resistance. In the conventional design, the only area of contact between the balls are the race are a small point on each individual ball. In the event of a significant shock, all the shock load is transmitted through these small points of contact. This can cause very high stresses at these points, and may result in permanent deformation of the race and/or ball. The present design improves shock resistance by substantially increasing the area of contact. Rather than being a plurality of small discrete areas on each ball, the area of contact in the present design is a continuous annular area on the bearing surface surrounding the axis. A slight elastic deformation of the surface in the event of shock causes a very large increase in the contact area to reduce stress, and thus avoids permanent deformation of the surface.

Because the bearing design of the present invention increases the contact area when compared with a conventional design using multiple balls in an annular race, there may be an increased tendency for materials to bond at the contact surfaces when lying idle for periods of time. Accordingly it is preferred that balls 201,202 be made of different materials than those used in mountings. Specifically, balls 201,202 are preferably formed of either ceramic or stainless steel J2100. Ceramic is the preferred material where it is not necessary to form an electrical ground path from the actuator to the base; where a ground path is needed, stainless steel is preferred. Mountings are preferably formed of hardened common steel 440C.

Many possible alternative combinations of materials for the balls and mountings are possible. For example, bronze is frequently an appropriate material for a mounting. It would even be possible to use polymeric materials in some applications, although polymers would probably be inappropriate for most disk drives. It would be possible to make balls and mountings of the same materials, although generally it is preferred that the balls be of a different and harder material than the mountings.

Both the stationery mountings and the mountings on the actuator could be separate parts as shown in FIG. 2, or could be integral with the base, cover or actuator. The actuator is typically formed of aluminum or magnesium, and it would be possible to machine the bearing surfaces in corresponding integral cylindrical projections of the actuator body, centered on the axis of rotation of the actuator. The base is typically aluminum, and bearing surfaces could similarly be machined in corresponding projections from the base or cover. As used herein, "mounting" refers to that portion of the assembly which contains the bearing surface, and includes both integral mountings and mountings which are separate pieces attached by adhesive, press fit, or other means.

As will be observed from the above description, the bearing of the preferred embodiment confines two freely moving axially centered balls within corresponding concave bearing surfaces. In the preferred embodiment, the concave surfaces are conical or frustro-conical, providing respective annular contact surfaces with the balls. However, many variations of the bearing surfaces are possible within the spirit and scope of the present invention.

FIG. 4 shows an enlarged cross-sectional view of a single ball 201 and corresponding conical bearing surfaces 210–211 as used in the preferred embodiment, in the plane of the actuator axis. In the sectional view, one can observe four points of contact 401A, 401B, 402A, 402B, between the ball and the bearing surfaces. In reality, these are not discrete points. "Points" 401A, 401B are really opposite ends of an annular contact area seen in cross section (and similarly 402A, 402B). The two annular contact areas surround and are centered on the axis. Assuming a perfectly spherical ball and perfectly conical bearing surfaces, the annular contact areas have zero radial width. However, there will always be some width to the annular contact area because the ball and bearing surfaces deform very slightly as a result of pre-load force, weight of assembly, dynamic loading, etc.

Figure 5:
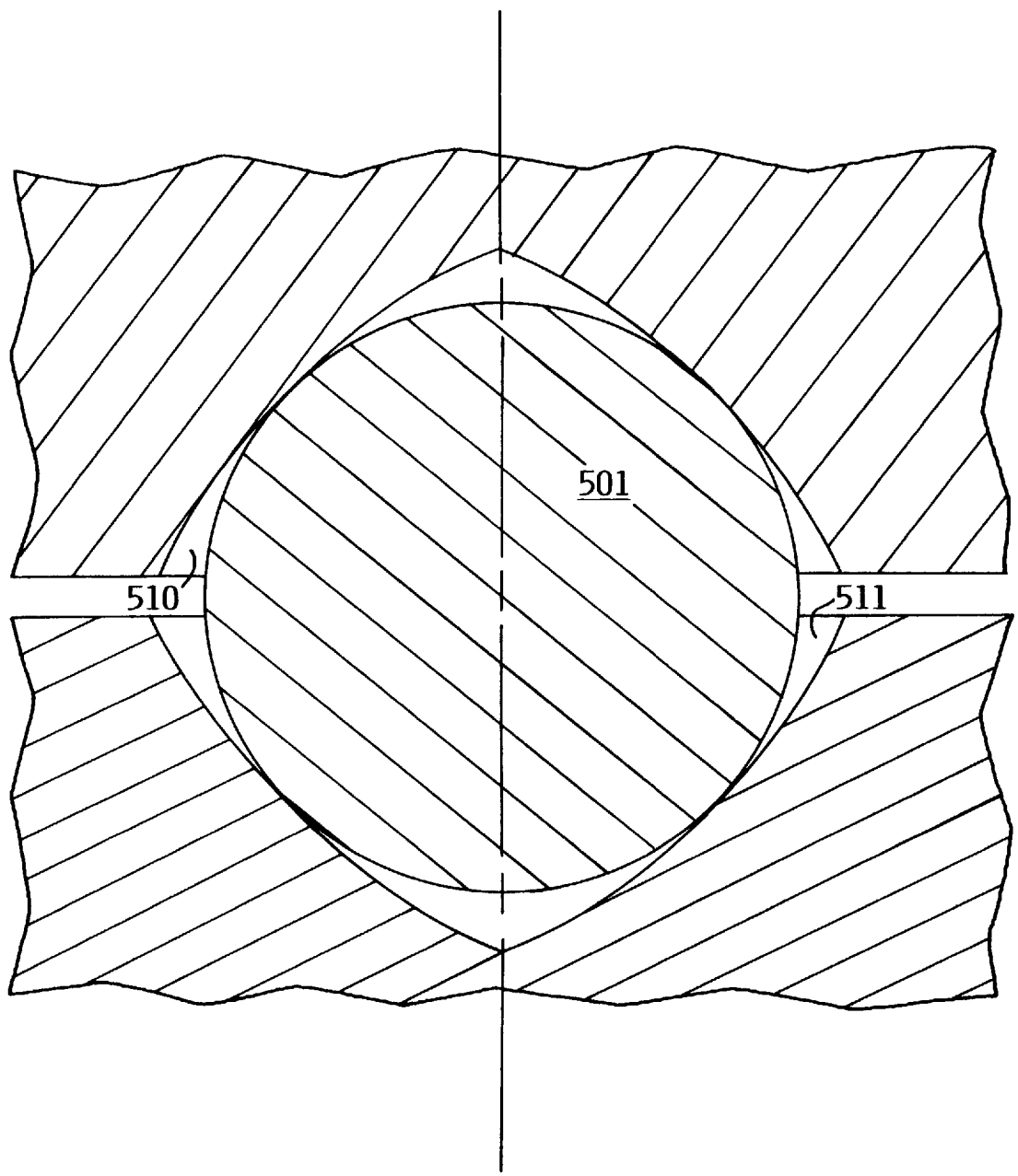
FIG. 5 is a cross-sectional view of a first alternative embodiment of a ball and corresponding bearing surfaces, showing arched bearing surfaces.

FIG. 5 shows an alternative embodiment of a ball 501 and corresponding bearing surfaces 510–511. In the alternative embodiment of FIG. 5, the bearing surfaces are curved at the point of contact with the ball. This curvature tends to increase the contact area, particularly when the bearing assembly is subjected to a severe load which elastically deforms the ball and mountings. I.e., the radial width of the annulus which forms the contact area would increase under load more rapidly than in the embodiment of FIG. 4. The alternative embodiment of FIG. 5 would therefore have a greater resistance to mechanical shock than the embodiment of FIG. 4. However, the embodiment of FIG. 5 would have certain drawbacks vis-a-vis that of FIG. 4, particularly, the increased contact area would likely increase the force required to overcome static friction (stiction) upon initial movement, and may increase drag during operation as well.

Figure 6:
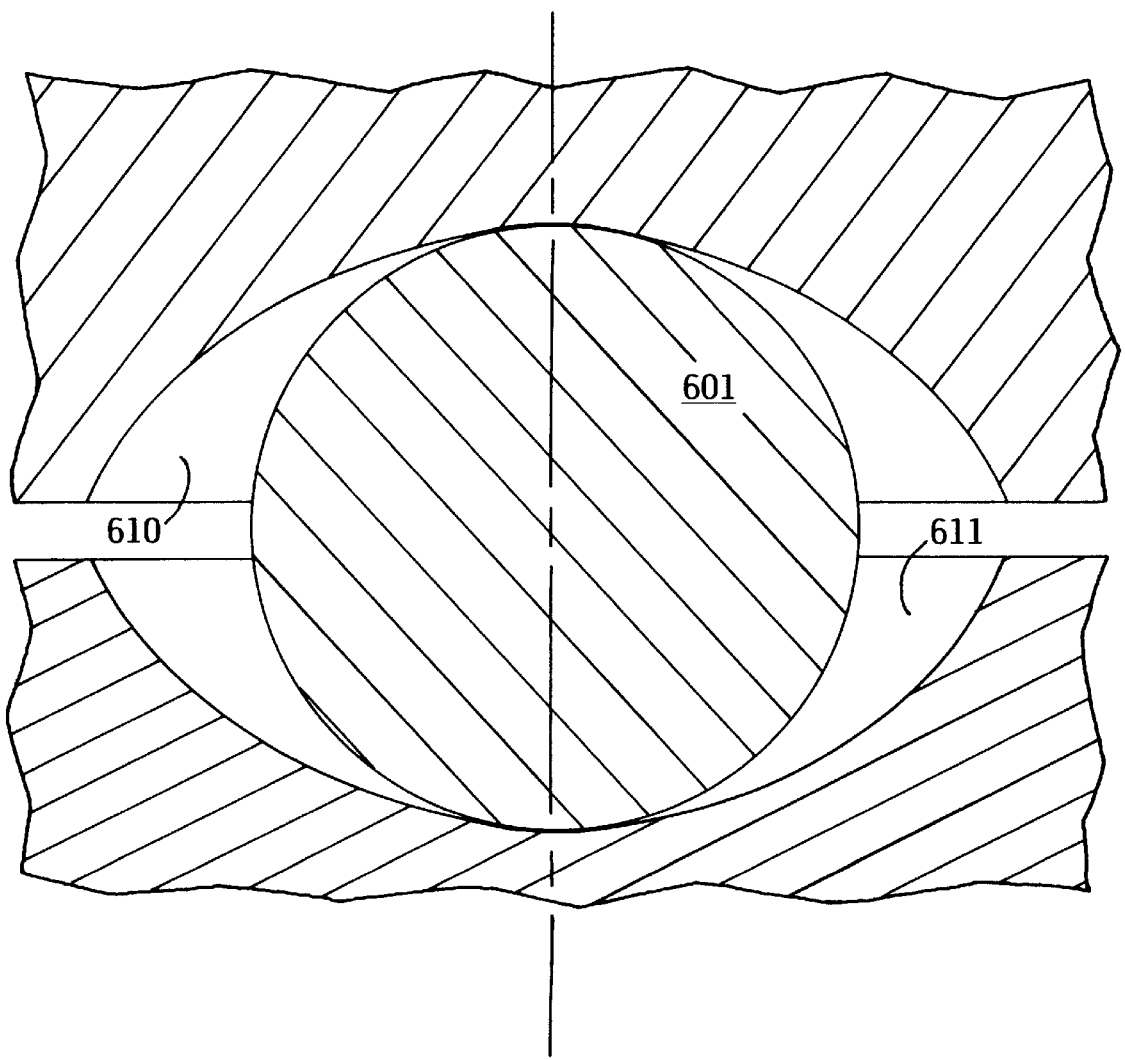
FIG. 6 is a cross-sectional view of a second alternative embodiment of a ball and corresponding bearing surfaces, showing spherical bearing surfaces.

FIG. 6 shows another alternative embodiment of a ball 601 and corresponding bearing surfaces 610–611. In the embodiment of FIG. 6, the bearing surfaces 610–611 form part of the inner surface of a sphere, the radius of the sphere defining the bearing surfaces being larger than the radius of the ball. As a result, ball 601 contacts bearing surfaces 610–611 at respective circular areas centered on the axis, rather than at annular areas. Under conditions of low axial compressive force, these circular areas become very small (almost points), resulting in very low stiction and drag. The contact areas increase in size when the assembly is subjected to shock loading. However, the embodiment of FIG. 6 is not likely to have equivalent shock resistance to those of FIGS. 4 or 5, since the contact area is much closer to the axis. Furthermore, the embodiment of FIG. 6 will have a lower accuracy of alignment of the rotatable assembly than those of FIGS. 4 or 5, and may have more of a tendency to wobble.

Figure 7:
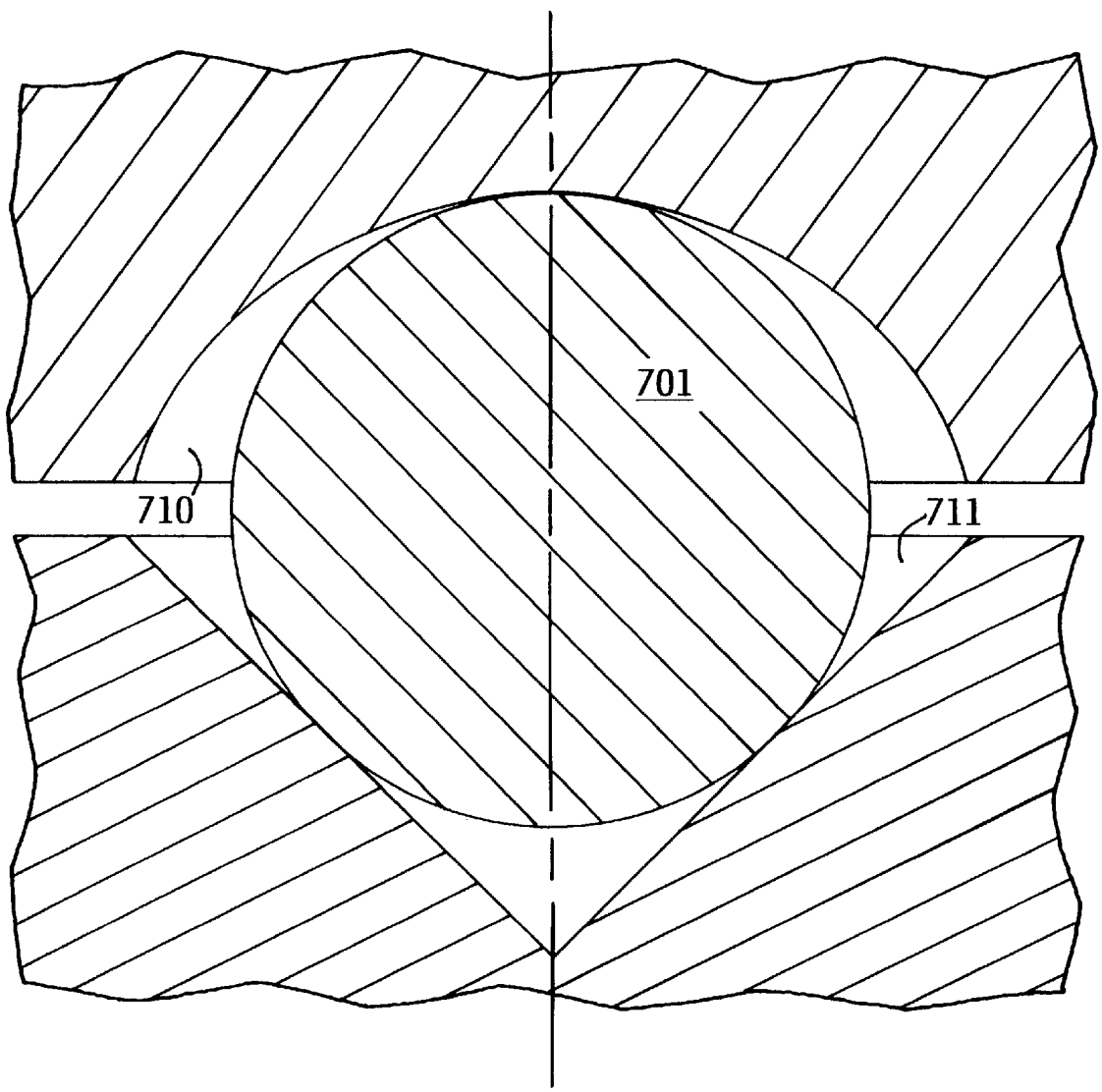
FIG. 7 is a cross-sectional view of a third alternative embodiment of a ball and corresponding bearing surfaces, showing a combination of conical and spherical bearing surfaces.

FIG. 7 shows yet another alternative embodiment of a ball 701 and corresponding bearing surfaces 710–711. The embodiment of FIG. 7 is a hybrid of the embodiments of FIGS. 4 and 6. One of the bearing surfaces 711 is conical as in FIG. 4, forming an annular area of contact with ball 701. The other bearing surface 710 is spherical as in FIG. 6, forming a circular area of contact at the axis. The embodiment of FIG. 7 is a compromise between the characteristics of the two constituent embodiments. It will have a lower stiction and drag than the embodiment of FIG. 4, although not as low as that of FIG. 6. I will also have more accurate alignment and higher shock resistance than the embodiment of FIG. 6, although not as good as that of FIG. 4.

Just as certain operating parameters of the preferred embodiment may be varied by varying the angles of the bearing surfaces, certain parameters of the embodiments of FIGS. 6 and 7 can be varied by varying the radii of the bearing surfaces. Specifically, a larger radius will tend to reduce the contact area, reducing drag and alignment accuracy. A smaller radius will tend to increase the contact area, improving alignment accuracy but increasing drag.

In the preferred embodiment, the pivot bearing is used to support an actuator for a disk drive. The bearing is particularly well suited to actuators, because actuators pivot back and forth. The mechanical resistance of an actuator having a conventional set of bearings and lubricant exhibits some hysteresis, due to the interaction of multiple balls and lubricant. This becomes more significant as the size of the disk drive (and actuator) is reduced. The design disclosed herein reduces this hysteresis effect because each bearing has only a single ball. However, such a bearing could also be used to support the disk spindle and rotor of a disk drive, particularly a small form factor disk drive, even though the spindle rotates in only one direction. The advantages of reduced size, part count, and susceptibility to mechanical shock are equally applicable to actuator bearings and disk spindle bearings.

Figure 8:
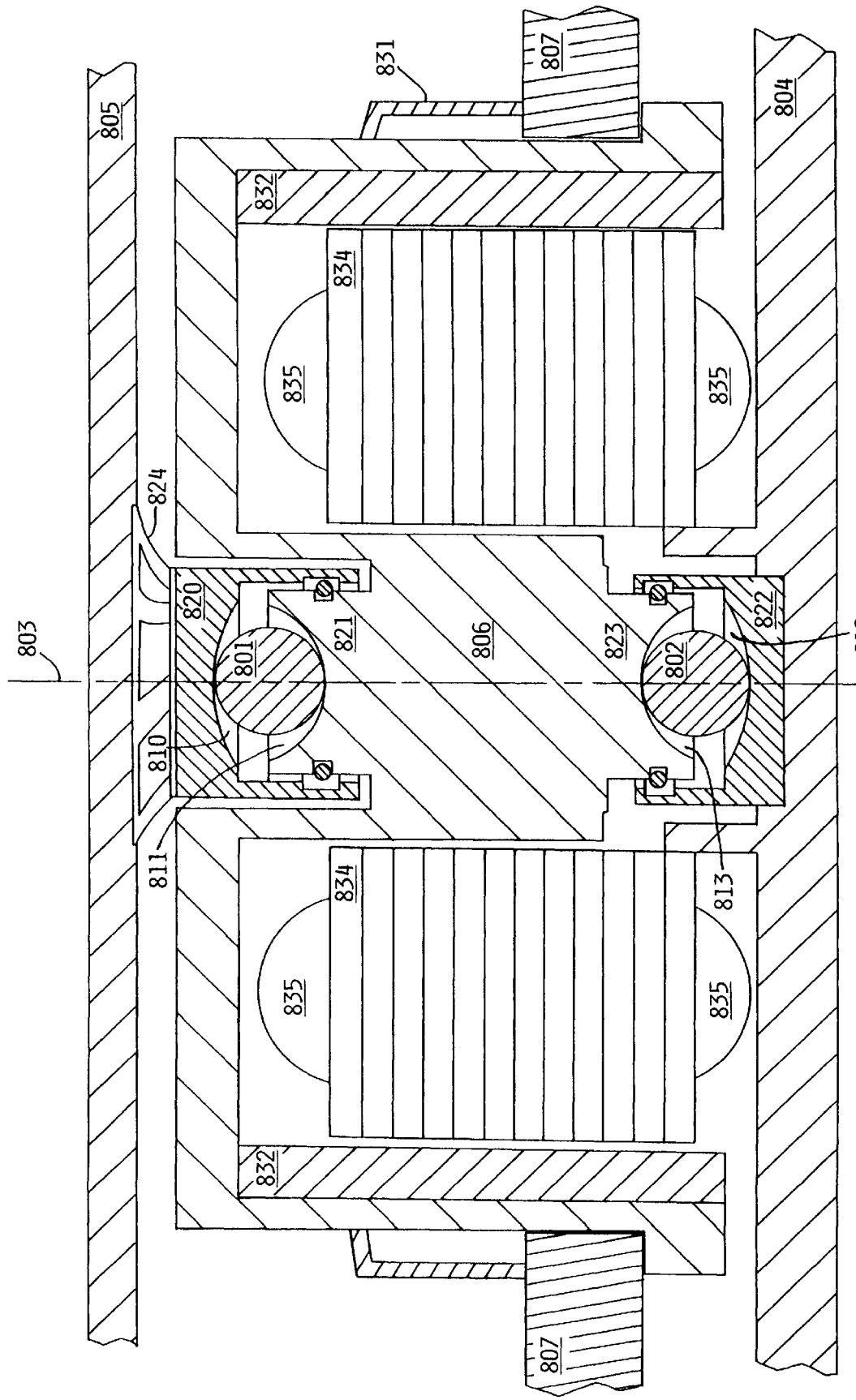
FIG. 8 is a cross-sectional view of a motor assembly employing the bearing assembly according to an alternative embodiment.

FIG. 8 is a cross-sectional view of a motor assembly employing the bearing assembly according to such an alternative embodiment. While the motor shown in FIG. 8 being used as the spindle drive motor of a disk storage device, it should be understood that similar motors could employing the bearing assembly of the present invention could be used in other applications. The sectional view of FIG. 8 is taken in the plane of the axis of rotation 803 of the disk. A pair of spherical balls 801,802 are positioned centered on axis 803 and axially separated by rotating housing 806. Lower stationary mounting 822 is rigidly attached to base 804 by adhesive or press fit. Upper stationary mounting 820 is attached to pre-load spring 824 with a suitable adhesive, which is in turn attached to cover 805.

Housing 806 includes integral mounting portions 821,823 at opposite ends of axis 803, having respective bearing surfaces 811,813 in contact with balls 801,802. While mounting portions 821, 823 are integral with the housing in the embodiment of FIG. 8, it should be understood that the mountings could be separate members attached to the housing. Corresponding bearing surfaces 810,812 of stationary mountings 820,822 contact balls 801,802 from opposite directions. Pre-load spring 824 imparts a controlled axial pre-load force through upper mounting 820, ball 801, housing 806, and ball 802. The pre-load force in conjunction with the concave bearing surfaces centers balls 801,802 on axis 803.

Balls 801,802 are preferably stainless steel J2100, and housing 806 and mountings 220, 222 are preferably common steel. However, various alternative materials could be used as in the case of the actuator of the preferred embodiment.

Rotor housing 806 is roughly a hollow cylinder, closed at one end, having a central shaft portion for engaging balls 801,802 and a flange for supporting disk 807 from below. Rotor housing is preferably steel to provide a magnetically permeable back iron for the permanent magnets. However, other materials such as plastic or aluminum may also be used, with or without a separate back iron member. A clamp mechanism 831 applies an axial force downward on disk 807, pressing it against the flange and holding it in place. Where multiple disks are used, spacers are interposed between each disk and the clamping mechanism presses the entire disk stack against the flange. Various clamping mechanisms and spacers are known in the art.

Housing 806 is hollow for placement of motor components. A set of permanent magnets 832 is fastened to the inside of rotor housing 806. An electromagnetic stator, comprising a core 834 and wire windings 835, is positioned surrounding axis 803 within the space formed by housing 806. Motor core 834 preferably comprises a series of laminations of a magnetically permeable material, such as silicon steel. Motor coils or windings 835 surround core 834 to form the stator electromagnet. The stator is divided into a plurality of circumferentially spaced poles, as is known in the art. Permanent magnets 832 are arranged as a plurality of poles of alternating polarity surrounding the stator, as is known in the art.

While the electric motor of FIG. 8 employs electromagnetic stator coils driven by alternating electrical current and permanent magnet rotors, as are conventionally used in disk drives and other small electric motors, it will be understood by those skilled in the art that an electric motor could employ any of various means for imparting a torque to the rotor in response to an electro-magnetic field. For example, the rotor could comprise a set of closed loop coils as are commonly used in "induction" motors.

The bearing assembly of the present invention could also be used in applications other than disk drives, where miniaturization, shock resistance, and cost reduction are significant goals. An example of another such possible application is the use of the bearing assembly to support rotating spools of magnetic tape in miniature magnetic tape cartridges.

Due to the reduced part count and simplicity of design, the bearing design of the present invention could be used in micro-mechanical applications, i.e., applications in which the sizes of moving parts are measured in microns. In present micro-mechanical applications, it is common to avoid the use of any type of ball or roller bearing, allowing rotating surfaces to directly contact stationary surfaces. As a result, the longevity of such parts is very limited. The use of a simple ball confined by concave surfaces could dramatically increase the longevity and reduce drag in such applications. Typically, bearing surfaces in such applications would be etched rather than machined.

In the preferred embodiment, a stamped steel pre-load spring is used to impart a controlled axial pre-load force to the bearings. However, it will be understood that a pre-load may be obtained through any of various alternative means. A spring may be constructed of helical or conical wire. Alternatively, a compressible material such as foam rubber may be used in place of the spring. The spring could also be mounted in other locations, e.g., on the rotor. As another alternative, the housing itself may be sufficiently elastic to provide a pre-load within acceptable limits without the use of any spring or auxiliary compressible material.

A bearing pre-load is usually considered desirable to give stiffness to the bearings and enhance their accuracy. If the bearings are not pre-loaded, the non-repeatable runout of the rotating assembly would be very large, i.e., the rotating assembly would tend to wobble in an unpredictable manner. This wobbling would probably make a bearing without pre-load unsuitable for application in an actuator or spindle motor of a disk drive, due to the need to follow very narrow tracks of data to a high degree of accuracy. However, there may be applications in which bearing pre-load is not required or not desirable. Bearings which are not pre-loaded would have reduced accuracy of alignment and reduced stiffness, but might also be cheaper, require even less space, and have reduced stiction. Therefore in an alternative embodiment of the present invention the bearings would not be pre-loaded.

In the description above, certain features have been referred to as "above" or "below" the actuator, or described as "upper" or "lower". These terms are used only for ease of reference and are consistent with the drawings and the normal orientation used in the art. However, the use of these terms is not meant to imply that the present invention requires any particular orientation, e.g. the pre-load spring to be located above the actuator. The disk drive of the present invention could just as easily be constructed with the pre-load spring located below the actuator, or with the axis of rotation oriented horizontally. Additionally, the words "pivot" and "rotate" have been used interchangeably to describe turning or spinning motion about an axis; unless limited by the context, these words should be understood to include motion in which the object turns a full 360 degrees as well as motion in which the object turns only through an arc of less than 360 degrees.

Although a specific embodiment of the invention has been disclosed along with certain alternatives, it will be recognized by those skilled in the art that additional variations in form and detail may be made within the scope of the following claims.

What is claimed is:

1. A bearing assembly for a rotatably mounted object, said rotatably mounted object having an axis of rotation, said bearing assembly comprising:

a first freely rotating ball and a second freely rotating ball, said balls being centered on said axis and axially separated;

a first stationary mounting, said first mounting having a first concave bearing surface centered about said axis and in contact with said first ball;

a second stationary mounting, said second mounting having a second concave bearing surface centered about said axis and in contact with said second ball; and a rotatable object comprising:

(a) a third concave bearing surface centered about said axis and in contact with said first ball, said third concave bearing surface opposing said first concave bearing surface along said axis, said first and third concave bearing surfaces confining said first ball, and (b) a fourth concave bearing surface centered about said axis and in contact with said second ball, said fourth concave bearing surface opposing said second concave bearing surface along said axis, said second and fourth concave bearing surfaces confining said second ball;

wherein at least one of said first concave bearing surface and said third concave bearing surface has a first arched portion thereof contacting said first freely rotating ball at a first annular area surrounding said axis, wherein an intersection of a plane containing said axis with said concave bearing surface having a first arched portion thereof defines a first curve at the location of said first annular area, said first curve curving inward toward said first ball but having a radius of curvature substantially greater that the radius of said first ball, said first curve diverging from the surface of said first ball as said first curve becomes more distant from said first annular area; and wherein at least one of said second concave bearing surface and said fourth concave bearing surface has a second arched portion thereof contacting said second freely rotating ball at a second annular area surrounding said axis, wherein an intersection of a plane containing said axis with said concave bearing surface having a second arched portion thereof defines a second curve at the location of said second annular area, said second curve curving inward toward said second ball but having a radius of curvature substantially greater that the radius of said second ball, said second curve diverging from the surface of said second ball as said second curve becomes more distant from said second annular area.

2. The bearing assembly of claim 1, wherein said third concave bearing surface and said fourth concave bearing surface are positioned between said first concave bearing surface and said second concave bearing surface.

3. The bearing assembly of claim 1, further comprising means for imparting a controlled axial pre-load to said first and second balls.

4. The bearing assembly of claim 3, wherein said means for imparting a controlled axial pre-load comprises a compressible spring supporting said second stationary mounting, said compressible spring imparting a controlled pre-load to said first and second balls.

5. The bearing assembly of claim 1,
wherein said first concave bearing surface and said third concave bearing surface have respective arched portions thereof contacting said first freely rotating ball at respective annular areas surrounding said axis, wherein an intersection of a plane containing said axis with said first and third concave bearing surfaces defines respective curves at the locations of said annular areas, each said curve curving inward toward said first ball but having a respective radius of curvature substantially greater that the radius of said first ball, each said curve diverging from the surface of said first ball as said curve becomes more distant from the respective annular area; and wherein said second concave bearing surface and said fourth concave bearing surface have respective arched portions thereof contacting said second freely rotating ball at respective annular areas surrounding said axis, wherein an intersection of a plane containing said axis with said second and fourth concave bearing surfaces defines respective curves at the locations of said annular areas, each said curve curving inward toward said second ball but having a respective radius of curvature substantially greater that the radius of said second ball, each said curve diverging from the surface of said second ball as said curve becomes more distant from the respective annular area.

6. The bearing assembly of claim 5, wherein said third concave bearing surface and said fourth concave bearing surface are positioned between said first concave bearing surface and said second concave bearing surface.

7. The bearing assembly of claim 5, further comprising means for imparting a controlled axial pre-load to said first and second balls.

8. The bearing assembly of claim 7, wherein said means for imparting a controlled axial pre-load comprises a compressible spring supporting said second stationary mounting, said compressible spring imparting a controlled pre-load to said first and second balls.

9. The bearing assembly of claim 1, wherein said rotatable object is an actuator assembly for a rotating magnetic disk drive data storage device.

* * * * *